Oct. 31, 1967

J. C. JUREIT 3,350,501

CABLE PROTECTOR

Filed Jan. 19, 1966

INVENTOR
JOHN C. JUREIT

BY LeBlanc & Shur

ATTORNEYS.

Oct. 31, 1967 — J. C. JUREIT — 3,350,501
CABLE PROTECTOR
Filed Jan. 19, 1966 — 2 Sheets-Sheet 2

INVENTOR
JOHN C. JUREIT
BY
ATTORNEYS.

United States Patent Office 3,350,501
Patented Oct. 31, 1967

3,350,501
CABLE PROTECTOR
John Calvin Jureit, Miami, Fla., assignor to Automated Building Components, Inc., Miami, Fla., a corporation of Florida
Filed Jan. 19, 1966, Ser. No. 521,631
The portion of the term of the patent subsequent to Mar. 15, 1983, has been disclaimed
5 Claims. (Cl. 174—135)

This application is a continuation-in-part of copending application Serial No. 393,585, filed September 1, 1964, now U.S. Patent No. 3,240,869.

This invention relates to a protector for electric cables and more particularly to a curved plate having integral punched-out teeth, which curved plate is useful in building construction for protecting, positioning and supporting lines routed through notched out studs, thus assuring protection against accidental puncturing of electrical cables, plumbing or other service lines. The protector of the present invention is particularly adapted for use in protecting three sides of an electric cable providing electrical service in light structural framing structures of the type commonly used in mobile homes.

As is well known, a variety of service lines, including electrical wiring, plumbing and gas lines as well as the larger air conditioning and heating conduits, pass through the wooden framing or supporting structure of a house or building. These cables and conduits usually pass through the wall studding between the walls to suitable outlets providing service to the home owner or building tenant. A larger number of cables and conduits are necessarily employed in construction in conjunction with the trend to ever-increasing services and more power operated equipment.

One serious disadvantage in providing a complex network of electrical cables and conduits through the walls of a structure lies in the increasing likelihood that the cables will be inadvertently damaged either before or after the structural unit is completed. This problem is particularly aggravated in light framework structures, such as mobile homes, where wood thicknesses are at a minimum so that the cable or conduit is less likely to be separated from the wall covering by sufficient wood material to prevent puncture by the average length nail or drill.

These cables and conduits are most easily run through the framework before the wall or wall covering material is put in place and are quite subject to damage, especially by being inadvertently punctured by a nail when the wall board or wall covering is nailed or otherwise secured in place. Very often the carpentry is done by some one other than the electrician or plumber installing the cabling or piping and as a result the carpenter may not be familiar with or remember the exact location of all the conduits and tubing running through the walls once they are wholly or partly covered by panelling. Furthermore, the damage is not likely to be discovered until the cables are completely covered and placed in usage, i.e. until the house is occupied, at which time the cables are not readily accessible through the finished walls and the exact location of the damage may be quite difficult to ascertain without taking out a complete wall or otherwise causing damage requiring extensive and also expensive repairs.

These problems have been recognized in the past, and various attempts have been made to shield cables and conduits from damage and particularly from inadvertent piercing by a nail either during construction or during subsequent usage by the home owner as occasioned by the drilling or nailing into the studs for purposes of supporting pictures, fixtures, or other wall supported elements. Most likely, the home owner is completely unaware of the exact location of the wiring within the walls of his house, and thus it is quite possible that he may by drilling or nailing inadvertently pierce an electrical cable or other conduit if not properly protected.

Prior devices provided to avoid this have not only included cable sheaths, but likewise have included protective plates and other shield devices to be placed over the cables to prevent them from being damaged. However, these prior plates have been of relatively thin construction having either separate or integral rather weak nails which are subject to bending when being driven into the walls and hence themselves constitute a substantial hazard to the conduit. This is especially true since the very plate which is supposed to protect the cable is conventionally hammered into the wood supporting member at a location closely adjacent the cable or conduit so that a slight bending of the nail or plate teeth during driving may easily result in serious damage to the cable.

The above and other serious disadvantages are quite satisfactorily overcome by the novel protector plate disclosed in the aforementioned copending application. There is shown in that application a novel protective plate especially suited for electric cables but also suited for protecting other conduits, which plate is of simplified, inexpensive and yet sufficiently rugged construction to adequately protect the cables while at the same time including teeth constructed in such a manner as to minimize any likelihood of the protective plate teeth damaging the cable when driven into the wood support. Although the flat plate of that application has proved very adequate in a wide variety of building structures, it protects the cables only from damage through one wall of the structure. Thus, when used in light framing, such as in mobile home constructions, wherein the studs and other wood supporting members are often only two-by-twos, rather than the more conventional two-by-four or larger size lumber, it is often necessary for complete protection to apply one of the aforementioned plates to both sides of the studs, so that the cable is protected from nailing or drilling into either side or surface of the wall through which the cable passes.

In a special notice to members dated February 24, 1965, the director of the Standards Division of the Mobile Homes Manufacturing Association, directed attention of the members to a portion of the American Standards Association A119.1 concerning wiring methods and appropriate wire protectors. In this special notice, it was pointed out that if the distance from either wall surface to the cable was less than 1½ inches, then a steel plate or tube (minimum 16-gauge thickness) is required for protection of the armored or non-metallic cable on the side or sides having the dimension less than the minimum 1½ inch allowed. Thus, the Mobile Home Manufacturers Association has taken official cognizance of the problem with respect to mobile home constructions, wherein the framing is made of lighter structural lumber, and damage to conduits is a possibility from both surfaces of the wall through which the conduit may pass.

In order to avoid the necessity for applying connector plates to both surfaces of a wall through which a cable member passes, the present invention provides a novel curved protector plate, in many respects resembling the plates of the aforementioned copending application, but having a curved or folded over end to give an overall J-shaped cross sectional configuration to the protector. That is, in many instances, the application of a second protector plate to the opposite wall or surface may not be readily effected such as for instance if one wall is already covered by a wall board or surface material before the cabling is inserted in place. Likewise, problems with respect to uniformity of the finish on one surface of the wall may make it undesirable to place a protector plate on that wall surface. For this reason, the present invention provides important advantages in terms of a single protector plate which may be inserted from only one wall surface but yet provides protection against damage from nailing or drilling into one or both surfaces of the wall.

Additional important features of the present invention reside in the fact that the novel protector plate of this invention provides a rigid support and retainer for the cabling which acts at all times to position and retain the cabling against inadvertent loosening or dislodgement from the wall during construction and which provides added protection to the cabling by presenting a protective metallic surface almost completely surrounding the cabling or other conduit. Finally, the novel J-shaped protector of this invention provides a device by means of which the cable may be picked up off of a floor and inserted into a notch or dado in a ready and efficient manner such that the cable is automatically properly positioned and may be readily slid along or drawn through the notch from the source to the service outlet as the cable is put in place, all without damage to the cable or its protective sheath.

It is therefore one object of the present invention to provide a novel protector for cables and other conduits.

Another object of the present invention is to provide a curved protector plate particularly suited for use in protecting electrical cables passing through wooden framework.

Another object of the present invention is to provide a metal protector particularly suited for use in conjunction with cabling or other conduits provided in mobile homes.

Another object of the present invention is to provide a cable protector insertable into position from one wall of a building structure and yet which protector prevents damage from nailing, drilling or otherwise puncturing either surface of the wall through which the cable passes.

Another object of the present invention is to provide a cable protector plate which also helps to accurately position and support a cable within a notch or dado provided in building structure support elements.

Another object of the present invention is to provide a cable protector plate with integral punched out teeth having tapered points extending away from the cable to be protected, which protector has a curved or turned over end to impart a substantial J-shaped overall cross sectional configuration to the protector.

Another object of the present invention is to provide a novel conduit protective assembly for building structures.

These and further objects and advantages of the invention will be more apparent upon reference to the following specification, claims and appended drawings, wherein:

Figure 1:
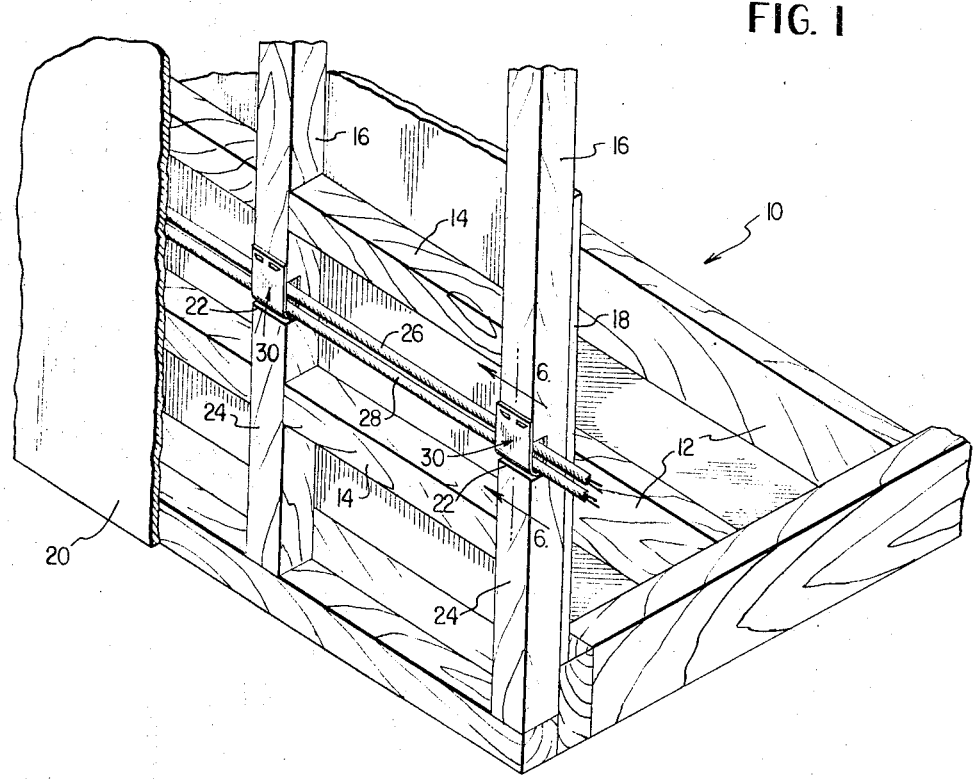
FIGURE 1 is a perspective view with parts in section showing a portion of a mobile home framework with a pair of electrical cables and cable protectors constructed in accordance with the present invention.

Referring to the drawings, there is shown in FIGURE 1 a wooden framework generally indicated at 10 comprising a portion of a mobile home or house trailer including floor stringers 12, wall stringers 14, and wall studs 16. The studs are illustrated as formed from pieces of two-by-two lumber and are adapted to be covered by interior wall panelling 18 and an exterior wall 20, which walls are conventionally nailed in place to the edges of the studs 16.

Figure 2:
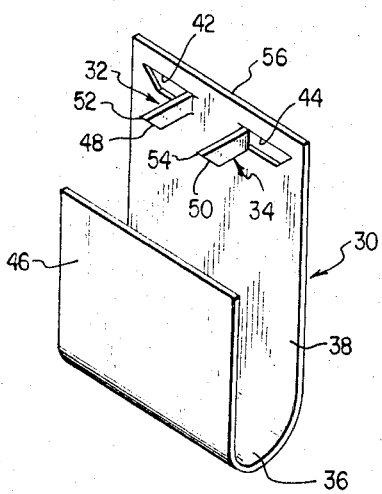
FIGURE 2 is an enlarged perspective view of one of the cable protectors of FIGURE 1.
Figure 3:
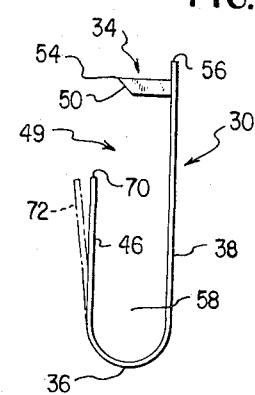
FIGURE 3 is a side view of the cable protector of FIGURE 2.
Figure 4:
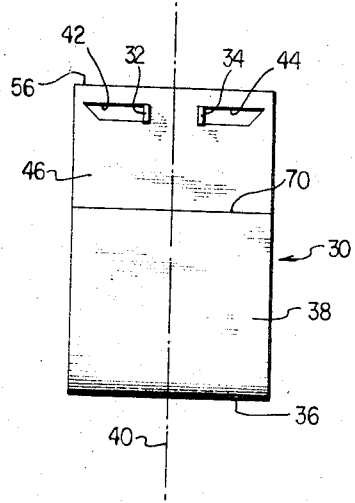
FIGURE 4 is a back view of the cable protector of FIGURE 2.

Each of the studs 16 is provided with a notch or dado in its edge 24, and a pair of cables 26 and 28 shown as passing through these notches, which cables carry electrical wiring for electric lights, cooking, and other electrical equipment which may be provided in the mobile home. Secured in each of the notches is a protective plate 30 constructed in accordance with the present invention and shown to an enlarged scale in FIGURES 2 through 4.

Figure 6:
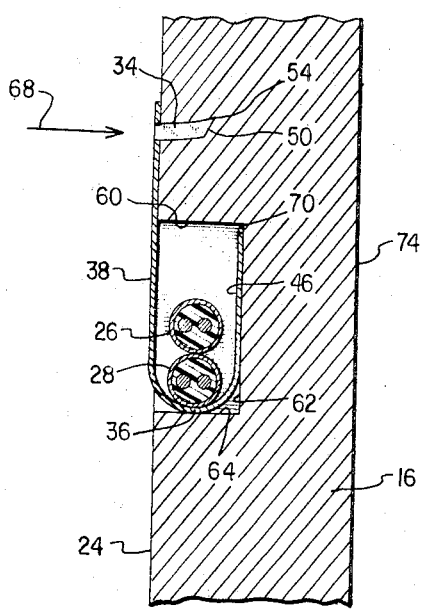
FIGURE 6 is a cross section through the cables and one of the plates of FIGURE 1 showing the protector in position in the wooden support member.

As best seen in FIGURE 6, the cables 26 and 28 are of conventional construction comprising a protective outer sheath filled with suitable insulation, the latter surrounding and spacing a pair of conductive wires or electrical leads. The connector 30 comprises a flat rectangular metal plate either plain or galvanized having punched therefrom a pair of teeth identified as 32 and 34 in FIGURE 2. These two teeth are equally spaced on opposite sides of the vertical center line 40 of the plate and leave corresponding elongated slots 42 and 44 extending perpendicular to the center line 40. The teeth are punched out and bent at an angle of 90 degrees to the plate to extend perpendicular from one surface thereof.

Teeth 32 and 34 are provided with flat tapered end surfaces 48 and 50 to define the tips 52 and 54 on that edge of each tooth adjacent the upper edge 56 of the plate. When the plate is driven into the stud 16 as best seen in FIGURE 6 so that the teeth are driven into the wood in the direction of the arrow 68, the points of the teeth will cause them to readily enter the wood without any undue bending. However, if there is a tendency for the teeth to bend, the flat surfaces 48 and 50 insure that the teeth 32 and 34 move outwardly away from the cables 26 and 28 due to the reaction force of the wood bearing upon these surfaces. Since the slots 42 and 44 extend parallel to the cables, the widest and also the strongest dimension of the teeth which lies parallel to the center line 40 is presented to resist vertical deflection further insuring that the teeth will not deflect into the cables. If desired, the teeth may be provided with a shallow V-shaped cross section (not shown) to provide additional strength to the teeth.

In the preferred embodiment, the teeth have a width, that is a dimension parallel to the center line 40, on the order of and preferably greater than the thickness of the plate, i.e. in the preferred embodiment of the tooth width is about three times the plate thickness. The teeth from the base to the extreme end of the point have an overall length of approximately ½ inch. While a variety of plates and materials can be employed, a galvanized 16-gauge (U.S. Standard gauge) metal plate has been found particularly suited for use as the protective plate 30 of this invention.

An additional important feature of the present invention resides in the fact that the lower end of the plate is bent around as at 36 to provide a front side 38 and a back side 46. Back side 46 terminates short of the teeth 32 and 34 to provide an access opening 49 for the cable. Spaced sides 38 and 46 define a central area 58 in which the cables are retained resting upon the inner surface of the curved lower portion 36 of the plate.

Figure 5:
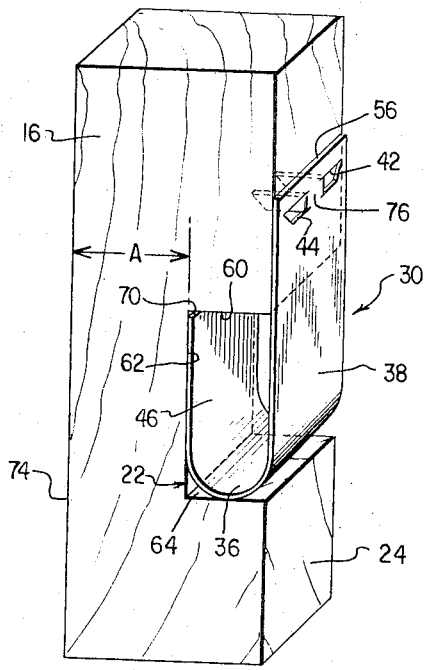
FIGURE 5 is a perspective view showing one of the cable protectors in position in a dado formed in a piece of two-by-two structural lumber.

As best seen in FIGURE 5, the notch 22 is preferably of rectangular configuration having a top 60, a back or side wall 62, and a bottom 64. The spacing between sides 38 and 46 of the protector is preferably approximately equal to the depth of the notch 22 such that the plate lines up vertically in the notch as illustrated in FIGURE 5 with the leg 38 overlying flat against the face 24 of the stud and the back side 46 of the plate likewise lying flat against and flush with the back wall 62 of the notch. Likewise the length of back wall 46 is preferably chosen so that it is readily received within the notch but substantially coextensive with the back wall 62 of the notch so that the curved portion of the protector rests on the flat notch bottom surface 64 and the upper end 70 is in close proximity to the top wall 60 of the notch. If desired, side 46 of the protector may be bent outwardly slightly away from the vertical as indicated by dashed lines at 72 in FIGURE 3 so that the cable may more easily be inserted through the opening 48 between the upper edge 70 and the tooth surface 50 of the protector.

It can be seen that with the connector in the position illustrated in FIGURES 5 and 6, the cables are readily protected from a drill or from a nail entering either the front face 24 of the stud or the back face 74. Similarly, nails driven at an angle into the front face 24 or those which might otherwise tend to bend around the edge of the plate cannot gain access into the interior area 58.

In the preferred embodiment constructed in accordance with the present invention, the protector plate is formed from a flat rectangular plate curved in the manner illustrated, which plate has an overall width of 1½ inches to closely approximate the actual width of the edge 24 of the stud 16, which by convention has a nominal width of 2 inches (unfinished width for a 2 x 2) but in actual practice when finished has a width substantially less than 2 inches. The length of the protector plate varies in accordance with the particular application as does the spacing between the sides 46 and 38 and the length of the side 46. These are all chosen in accordance with the length and depth of the notch or dado which in turn depends upon the size of the cabling or conduit to be supported. In the embodiment previously described, the overall length of the protector was 2¼ inches from the top edge 56 adjacent teeth 32 and 34 to the lowermost portion of the curved end 36. The vertical length of the side 46 in this same embodiment from the lowermost portion of curved section 36 to the edge 70 was approximately 1⅜ inches. For this embodiment, the overall depth of the plate, that is from the outer edge of side 38 to the outer edge of side 46, was in the neighborhood of from ½ to ¾ of an inch.

The connector plate of the present invention not only protects both sides of the cable, which is of particular importance in situations where the dimension A illustrated in FIGURE 5 between the stud surface 74 and the back wall 62 of the notch is less than about 1½ inches, but also provides a holder and positioner for the cable passing through the notch so that it does not inadvertently become jarred loose therefrom during construction, such as by the builder or electrician sliding the cable through the notch or by inadvertent contact with the cable. At the same time, the cable protector of the present invention provides means by which the electrician or carpenter may pick up the cable and readily and easily place it into the notch or dado. Before the protector is inserted in place, the cable is simply slipped through the gap 49 and pushed downwardly by the fingers in the area 50 until the lower side of the lowermost cable (if more than one) engages the curved surface 36. Then the back side 46 of the protector plate is inserted into the dado in a vertical position and the outer or front side 38 secured to the front surface 24 of the stud by a single blow of a hammer in the area 76 of the plate illustrated in FIGURE 5 between the teeth 32 and 34, but on the opposite surface therefrom. The two teeth act much in the manner of a single nail, but have the advantage of preventing the plate from tilting or cocking before or during the hammering operation, such that the plate may be readily aligned and easily and rapidly driven into the wood stud 16.

While described in conjunction with the preferred embodiment as formed from a 16-gauge galvanized flat metal plate, it is apparent that the protector of the present invention may be formed of other materials and may be formed of other sizes, widths and thicknesses in accordance with the particular use to which the protector is put. The teeth 32 and 34 are preferably of slender elongated configuration, so as to have good withdrawal resistance such that they readily support the protector and cable in position with the aid of the curved portion 36 and top edge 70 preferably snugly received in the notch 22.

Figure 7:
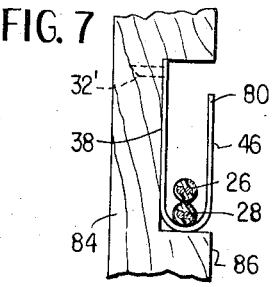
FIGURES 7 and 8 are side and front views respectively of a modified curved protector plate constructed in accordance with this invention showing it completely received within a notch or dado in the lumber.
Figure 8:
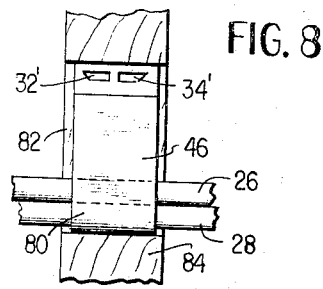

FIGURES 7 and 8 show a modified protector similar to that previously described but having its teeth punched out in the opposite direction i.e. away from rather than toward short side 46. In this embodiment the modified protector plate 80 again is comprised of short side 46 and long side 38 with a pair of teeth 32' and 34' punched out adjacent the top edge of the long side of the plate. However the teeth 32' and 34' which are otherwise identical to teeth 32 and 34 of the previous embodiment extend away from the plane of the short side 46 of the protector rather than toward it.

Protector plate 80 is an "inside" plate in that it is received entirely within a slightly larger notch or dado 82 formed in stud 84. This makes it possible to attach wallboard or other suitable covering material flush to the front surface 86 of stud 84. Plate 80 again provides substantial protection for electrical cables against damage and except for the direction of teeth 32' and 34' is preferably identical to protector plate 30 previously described.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A cable protector comprising a flat rectangular plate curved to form a J-shaped cross section having substantially parallel long and short sides joined by an integral bight portion, a pair of teeth struck from said plate adjacent to but spaced from the edge of said long side remote from said bight portion, said teeth extending normal to one surface of said long side of said plate.

2. A protector according to claim 1 wherein said plate is galvanized.

3. A protector according to claim 1 wherein said plate is at least as thick as 16-gauge metal.

4. A cable protector comprising a flat rectangular metal plate bent to form substantially parallel long and short sides joined by an integral folded over portion, a pair of teeth struck from said plate adjacent the edge of said long side remote from said folded over portion, said teeth extending normal to one surface of said long side toward the plane of said short side, each tooth having a slanted substantially flat surface at its end terminating in a tooth tip on that side of the tooth facing said edge.

5. A cable protector comprising a flat rectangular plate bent to form a J-shaped cross section having substantially parallel short and long sides joined by an integral curved portion, a pair of teeth struck from said plate adjacent to but spaced from the edge of said long side remote from said curved portion, said teeth being normal to one surface of said long side and extending toward the plane of said short side, said teeth being equally spaced on opposite sides of a centerline perpendicular to said edge, end leaving slots parallel to said edge and extending from said teeth away from said centerline, each tooth having a substantially uniform cross section throughout the majority of its length and having a slanted substantially flat surface at its end terminating in a tooth tip on that side of the tooth facing said edge.

References Cited

UNITED STATES PATENTS

| | | | |
|---|---|---|---|
| 3,211,824 | 10/1965 | Heiman | 174—48 |
| 3,211,825 | 10/1965 | Clos | 174—48 |
| 3,240,869 | 3/1966 | Jureit | 174—135 |

LARAMIE E. ASKIN, *Primary Examiner.*

H. HUBERFELD, *Assistant Examiner.*